(12) United States Patent
McNelly

(10) Patent No.: US 6,627,434 B1
(45) Date of Patent: Sep. 30, 2003

(54) METHOD AND APPARATUS FOR CONTROLLED COMPOSTING AND BIOREMEDIATING

(76) Inventor: James J. McNelly, 1034 Bromo Ave., St. Cloud, Stearns, MN (US) 56303

(*) Notice: Subject to any disclaimer, the term of this patent is extended or adjusted under 35 U.S.C. 154(b) by 0 days.

(21) Appl. No.: 09/432,822

(22) Filed: Nov. 2, 1999

Related U.S. Application Data

(63) Continuation-in-part of application No. 09/184,501, filed on Nov. 2, 1998, now Pat. No. 6,281,001, which is a continuation-in-part of application No. 08/556,503, filed on Nov. 13, 1995, now abandoned.

(51) Int. Cl.⁷ .............................................. C12M 1/00
(52) U.S. Cl. ................................. 435/290.1; 435/286.6
(58) Field of Search ........................... 435/289.1, 290.1, 435/290.2, 290.3, 286.6

(56) References Cited

U.S. PATENT DOCUMENTS

| | | |
|---|---|---|
| 1,980,244 A | 11/1934 | Wright |
| 2,734,803 A | 2/1956 | Ruskin |
| 3,357,812 A | 12/1967 | Snell |
| 3,916,987 A | 11/1975 | Giansante |
| 4,046,689 A | 9/1977 | Argyll |
| 4,139,640 A | 2/1979 | Kipp, Jr. |
| 4,161,426 A | 7/1979 | Kneer |
| 4,255,389 A | 3/1981 | Jung et al. |
| 4,272,489 A | 6/1981 | Lutz et al. |
| 4,274,838 A | 6/1981 | Dale et al. |
| 4,326,874 A | 4/1982 | Burklin |
| 4,339,265 A | 7/1982 | Englemann |
| 4,374,804 A | 2/1983 | Easter, II |
| 4,384,877 A | 5/1983 | Nemetz |
| 4,411,682 A | 10/1983 | Brill |
| 4,414,335 A | 11/1983 | Kipp, Jr. |
| 4,426,020 A | 1/1984 | Presseau et al. |
| 4,436,817 A | 3/1984 | Nemetz |
| 4,659,472 A | 4/1987 | Nordlund et al. |
| 4,662,900 A | 5/1987 | Ottengraf |
| 4,798,802 A | 1/1989 | Ryan |
| 4,869,877 A | 9/1989 | Sellew et al. |
| 4,946,108 A | 8/1990 | Konig et al. |
| 4,956,002 A | 9/1990 | Egarian |
| 4,994,245 A | 2/1991 | Murray et al. |

(List continued on next page.)

FOREIGN PATENT DOCUMENTS

CH 000679644 A5 3/1992

*Primary Examiner*—David A. Redding
(74) *Attorney, Agent, or Firm*—Albert W. Watkins

(57) ABSTRACT

The invention includes a method and apparatus for composting source materials such as organic materials, but also including hazardous and toxic material, by maintaining composting conditions within preselected limits. A sealable container includes an insulated chamber having a base with a gravity well; a flat, perforated floor forming a small air and leachate drain space between the floor and base, and air inlet and outlet conduits. Dampers control flow of air or other gases responsive to various conditions or sensors. According to the method, the composition of the organic material is amended and/or inoculated as required to convert the source material to a compostable mixture. Incubating forms a composting mixture from the compostable mixture. The method includes the steps of monitoring and adjusting conditions of the composting mixture to maintain the conditions within preselected limits. The conditions of the composting mixture are adjusted by aerating the composting mixture or re-mixing the composting mixture. The re-mixed composting mixture is incubated to yield composted organic material. Various systems are disclosed which use sealable containers designed to function with existing material handling equipment, including, alternatively, fork trucks, roll-off trucks, and intermodal equipment.

10 Claims, 4 Drawing Sheets

U.S. PATENT DOCUMENTS

| | | |
|---|---|---|
| 5,023,178 A | 6/1991 | Schiene et al. |
| 5,028,197 A | 7/1991 | Krein et al. |
| 5,049,486 A | 9/1991 | Blackwood et al. |
| 5,071,622 A | 12/1991 | Dunson, Jr. |
| 5,080,786 A | 1/1992 | De Lima |
| 5,102,803 A | 4/1992 | Weaver |
| 5,137,687 A | 8/1992 | Dunson, Jr. |
| 5,160,707 A | 11/1992 | Murray et al. |
| 5,175,106 A | 12/1992 | Laurenson, Jr. |
| 5,190,572 A | 3/1993 | Long |
| 5,206,173 A | 4/1993 | Finn |
| 5,248,612 A | 9/1993 | Johnson |
| 5,275,733 A | 1/1994 | Burnham |
| 5,312,754 A | 5/1994 | Bryan-Brown |
| 5,354,349 A | 10/1994 | Inoue |
| 5,387,036 A | 2/1995 | Hagen et al. |
| 5,395,417 A | 3/1995 | Thomas |
| 5,407,809 A | 4/1995 | Finn |
| 5,409,831 A | 4/1995 | Wright |
| 5,417,736 A | 5/1995 | Meyer |
| 5,417,861 A | 5/1995 | Burnham |
| 5,597,732 A * | 1/1997 | Bryan-Brown ............ 435/290.4 |
| 5,846,815 A * | 12/1998 | Wright .................... 435/290.4 |
| 5,869,327 A * | 2/1999 | Grabbe et al. ........... 435/286.6 |

* cited by examiner

METHOD AND APPARATUS FOR CONTROLLED COMPOSTING AND BIOREMEDIATING

CROSS REFERENCE TO RELATED APPLICATIONS

The present application is a continuation-in-part of U.S. patent application file date Nov. 2, 1998 Ser. No. 09/184,501, now U.S. Pat. No. 6,281,011, which is a continuation-in-part of U.S. patent application Ser. No. 08/556,503, file date Nov. 13, 1995 now abandoned.

TECHNICAL FIELD

This invention relates generally to a method and apparatus for composting source material, and more specifically to a method and apparatus for maintaining composting conditions within preselected ranges.

BACKGROUND OF THE INVENTION

While landfill space is dwindling or becoming more costly or distant, industrial and municipal waste production is increasing. Furthermore, an ever-increasing variety of materials are developed and introduced into the waste stream. Consequently, the safe disposal of solids resulting from wastewater treatment is continually more challenging and complex.

Composting, which, for the purposes of this disclosure will be defined as "the use of living, microbial organisms to convert solids and liquids into more environmentally safe and/or beneficial by-products," is a potentially viable alternative to landfills for the disposal of organic materials from nearly all waste streams. Composting can be used, for example, to process municipal wastewater biosolids, to remediate industrial waste water solids, and to treat wastes and by-products from processing food and agricultural products. Composting can reduce the volume of organic waste materials by 50% or more, yielding a stable, non-odorous material that can be used as fertilizer or as an amendment for soil.

Before about 1970, composting was typically a simple process in which waste materials were piled and allowed to sit until they decomposed. It was most frequently done on a small scale and was not often considered for industrial-scale problems. Grinding the material to be composted was considered advanced technology.

An advance in composting technology came from the realization that adding air to the composting mixture could increase the efficiency of composting. The microbes that produce compost require air and will smother inside of a static unaerated pile. Hence, the initial methods of aeration involved moving or agitating the compost to allow air into the stack.

A typical example of this aeration is a windrow turner that picks up the compost and dumps it to one side. Approximately 95% of municipal composting sites are currently windrow turner operations, though process control is, unfortunately, quite primitive. Piles are typically turned at the convenience of the operator, rather than to optimize the composting process. A typical pile of compost will use all of its oxygen within about one-half hour, so such windrow turning is seldom related to actual oxygen demand. Turning is done seldom enough that microbes in the center of the pile are rapidly depleted, and the center of the pile stops composting. Turning the pile merely re-inoculates the center material with fresh microbes, and composting continues in the center of the pile for another one-half hour when the oxygen supply is, once again, depleted. Unfortunately, the repeated mechanical actions that are required for turning destroy some beneficial fungi that rely on large, filamentous growth. In addition to the oxygen and mechanical problems introduced by a windrow system, composting with windrow turners is typically done in an open, unsheltered area. The vagaries of weather and rainfall most often determine the water content of the composting mass. When there is too little rain, the pile is too dry. When there is too much rain, the pile is wet and requires frequent turning. Too much rain can also lead to problems with runoff of leachate.

One method used to overcome some of the disadvantages of pile composting is to enclose compost piles in a building. An enclosure that keeps rain off of the compost allows better regulation of water content. However, such a facility is very expensive. Furthermore, with pile composting, various irritating and potentially toxic gases are sometimes produced. Since operators must enter the enclosure to maintain the composting process, enclosing compost also involves maintaining the quality of large volumes of air within the building. Without high-quality and high-quantity air handling systems, the atmosphere within an enclosure can be irritating, if not toxic, to an operator.

Some of the disadvantages of pile composting are overcome by more modern reactor vessel processes. By design, the reactor vessel is typically only slightly larger than the compost which it contains. This reduces the land area required to store the compost during the composting process. In addition to reduced land area, the total volume containing or enclosing the compost is also reduced. Lower total volume means reduced air handling requirements. Furthermore, in-vessel reactors also provide the opportunity for collection of potentially odorous emissions. The compost is enclosed, and exhaust air may be routed through a filtration system. This separation of operator from compost air benefits the health and safety of all operators. There are other benefits, beyond land space and air handling, from reactor vessels. Handling and mixing, which is required in all systems, can also be mechanized using reactor vessels, and the compost is enclosed.

Unfortunately, vessel systems to date are complicated systems which require precision construction techniques and permanent, stable foundations. This necessarily drives the cost of present reactor vessels systems to levels even higher than required for building-type enclosures. In exemplary prior art systems, organic waste is fed into an opening at one end of the reactor and compost is removed from the other end. The material is moved through the reactor by, for example, a complex moving floor apparatus or hydraulic ram. Aeration is sometimes provided by pressurized air forced through the organic waste from air vents located throughout the moving apparatus.

Some in-vessel systems also include mixing systems, typically rotating paddles or prongs, within the compost mass. Other in-vessel systems are static. The agitation systems used with in-vessel systems are expensive, prone to wear and failure, and provide agitation at intervals that are not readily controlled with respect to the progress of the composting process.

There remains a need for an improved and economical in-vessel composting process which is convenient, low-cost, efficient, odorless, scalable, and not labor intensive.

SUMMARY OF THE INVENTION

The present invention provides a method of composting large quantities of organic material under controlled, preselected conditions. Conditions which are known and documented elsewhere as being beneficial to composting, such as temperature, water level, carbon and nitrogen content, oxygen supply, microbial activity, and other similar conditions may be monitored and adjusted through the preferred method and apparatus of the invention. In addition, the operator is not exposed to hazardous gases with the present apparatus. As a result, the preferred method and apparatus allow an operator to more safely maintain both the composition of the material and the processes within preselected, optimal limits. Through careful selection of available components, the inventive apparatus may be manufactured at costs that are a fraction of those previously available for vessel-type reactor systems, using only a fraction of the real estate previously required, while obtaining enhanced results.

The invention includes a method for composting source material within a sealable container. Adjusting the composition of the source material to within preselected limits converts the source material to a compostable mixture. The composition is adjusted by amending the source material and by mixing the amended material with a bulking agent and an inoculant. The method includes the steps of monitoring and adjusting conditions of the composting mixture to maintain conditions within preselected limits. The conditions of the composting mixture are adjusted by aerating the composting mixture and/or re-mixing the composting mixture. The remixed composting mixture is incubated in order to yield composted organic material. Preferably, re-mixing includes transporting the composting mixture from the site at which it is incubated to a tipper and/or mixer separate from the incubation site.

The invention also includes an apparatus for composting source material. At least one sealable container converts a source material to a composted material. An air management apparatus delivers air to the composting mixture, a control unit measures temperature within the composting mixture, and a biofilter removes odors from the air to prevent escape of noxious odors from the system. The sealable container can be filled with source material, and then the material can be dumped from the sealable container, which simultaneously cleans air vents in the container floor. The partially composted material can be amended and re-mixed, and then the material can be returned to the sealable container. Also included in the system is a dumping system for removing composting material from the sealable container. The system can optionally include at least one curing bin for storing the composted material, after the composting process, in a sealable container.

The system of the invention can be tailored to the individual needs and limitations of the site where the system is located. For example, a system for highly populated urban areas can comprise a sealable container that can hold approximately 1 cubic yard and a dumping system that might comprise a small forklift. A mid-sized system can comprise a plurality of 40 or 50 cubic yard roll-off garbage containers and a tippable roll-off truck. A large system can comprise a plurality of 80 cubic yard or larger intermodal containers located at a shipping port or railroad yard, a dumping system and an overhead crane. The system includes an apparatus for transporting the sealable container from the site at which composting occurs to a mixing station, where re-mixing occurs, and/or an apparatus for dumping or tipping the container at the mixing station.

DETAILED DESCRIPTION OF THE PREFERRED EMBODIMENT

Figure 1:
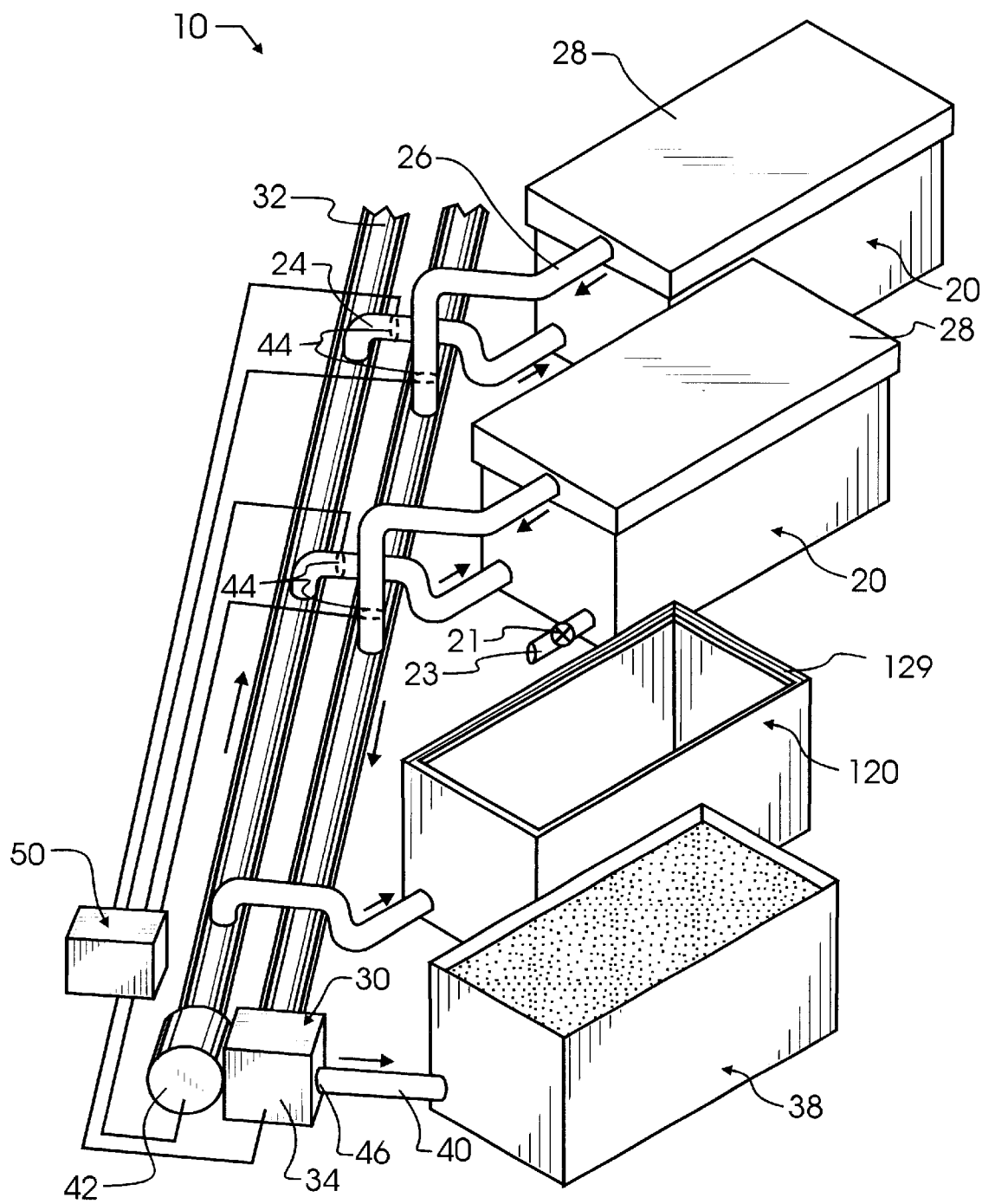
FIG. 1 is a schematic diagram of the composting system of the invention.
Figure 2:
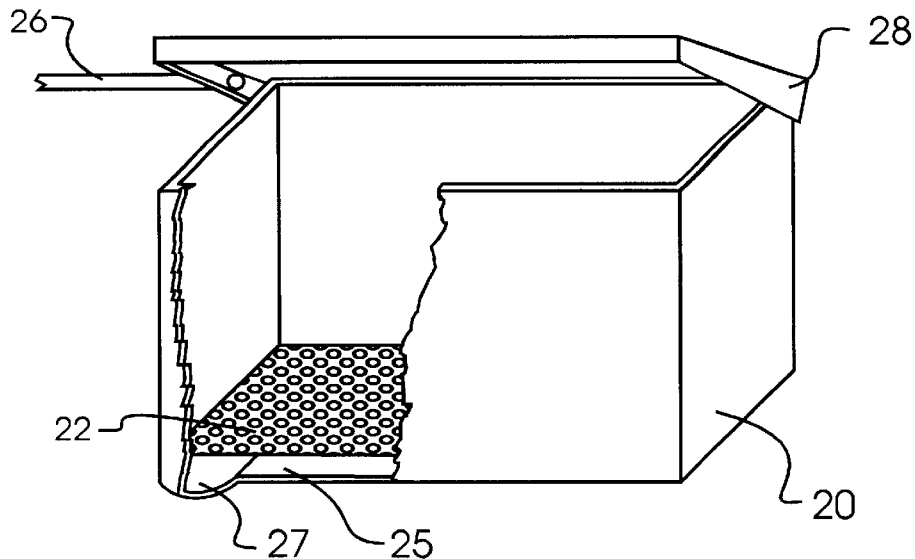
FIG. 2 is a schematic diagram of a sealable container including a perforated false floor.

The preferred composting apparatus, illustrated as a system in FIG. 1, includes one or more sealable containers 20 illustrated in greater detail in FIG. 2. The size of sealable container 20 should be selected for each particular location and system. As a general rule, size and number of containers 20 is determined by the handling equipment available, volume of source material to be processed, desired available surge capacity, cost per unit capacity, and frequency of re-mixing. Sealable container 20 should not be too large to be moved and dumped. The maximum size is typically limited by equipment available for handling container 20 and available space for container 20. While there is no minimum size, sealable containers 20 are practically limited. Containers 20 need to be sufficiently large to allow an adequate supply of material for appropriate mixing, inoculation, and self-heating, and also to allow space for ventilation inlets and outlets and a leachate drain. Container 20 may preferably be insulated to reduce the amount of compost required for self-heating, to improve efficacy during colder weather, and to maintain a more consistent temperature throughout the compost. Supplemental heaters may also be provided, for the same purposes. Insulation and heaters each enable container 20 to be somewhat smaller than would otherwise be required. However, heaters are not preferred, due to the inherent flammability of compost materials.

In a large area, in order to optimize space and processing equipment, it is preferable that the size of sealable container 20 ranges from about 10 cubic yards to 120 cubic yards, and one or more sealable containers 20 may be used. For small areas, such as urban sites, one or more 1 cubic yard containers can be most economical and feasible. In the most preferred embodiment, containers used for commercial and residential rubbish removal will be retrofit in accordance with teachings herein. These rubbish containers are available in a "roll-off" form. Intermodal containers, designed for transport on ocean freighters and various land vehicles, are also useful containers. In a preferred embodiment, sealable container 20 is large enough to contain about 40 to 50 cubic yards of composting mixture and can be similar to a 40 to 50 yard commercial waste container or an intermodal container. A 40 to 50 cubic yard sealable container can hold 20 to 30 tons of compostable mixture at a 60% moisture content, which is about 1 ton per day of compostable mixture based on a 21 day retention time. When used for 7 day retention, a system with a single 40 yard container can handle about 3 tons of compostable material per day. A most preferred size for sealable container 20 is a 9.5 foot width by 8 foot height end section having up to a 50 foot length. Preferably, sealable container 20 is rectangular or square for ease of loading, transport and dumping. However, other shapes which suit the needs or fashion of the designer can also be used.

Depending on the shape and size of sealable container 20, it may be preferable to have a side door in one of the vertical walls in addition to lid 28 on the top of the container. For example, a rectangular container can have a hinged door at one end for dumping the composted mixture. Alternatively, the composted mixture can be removed through lid 28 of container 20, preferably also by dumping. Lid 28 can be continuous across the top of the container (that is, one lid), or lid 28 can include several sections that may or may not be connected to each other. Preferably, lid 28 is hinged to the side of container 20. If more than one lid section is present, each lid section may be directly hinged to the side of container 20. Lid 28 provides easy loading with the use of conventional equipment, through natural gravity assistance. Optional features may be provided with container 20, such as access doors for maintenance, ladders for easy access to lid 28, rain gutters to control rain run off, or portholes for visual or measuring instrument in-situ observation. However, these features should not hinder the moving and dumping of the container.

Each sealable container 20 must be sufficiently durable to stand up to the composting process and associated material handling. Sealable container 20 should be fairly rigid, so that it is able to withstand any harsh elements such as driving winds, rain, ice, etc. and also maintain its integrity under the force of the composting mixture against the walls of the container, without bulging. It should maintain structural integrity during transport, and be able to withstand any twisting, bumps, pulling, pushing and the like which it might encounter during filling, lifting, transport and dumping. The walls should be sufficiently thick and strong to withstand punctures, too dents or other defects which can be caused by large pieces of debris in the composting mixture or by the transport and dumping process. The walls and floor should also be sufficiently corrosion resistant to withstand the various chemical processes that will occur during composting. Suitable materials include metal (stainless steel, aluminum, coated or corrosion resistant iron, etc.), plastic (polyethylene, polycarbonate, polypropylene, etc.), wood, reinforced or composite materials, or other suitable materials. The container can be painted or otherwise treated to protect the surface from exposure. The container can also, or alternatively, be equipped with a liner. As aforementioned, container 20 will most preferably be insulated. Where commercial containers such as roll-off or intermodal containers are utilized, the insulation will be provided as a retrofit.

It is desirable for sealable container 20 to be sealed to retain leachate, exclude rain water, contain unpleasant gases which can result from the composting process, and maintain controlled conditions and a favorable environment within container 20. The exclusion of rain water allows the operator to control water content, and controllable air flow allows control of the temperature and oxygen content of the composting mass. Lid 28 forms a top seal together with a rubber gasket 29. Where a front, vertical door is provided, an additional rubber gasket will most preferably complete the seal.

Sealable container 20 includes a perforated floor 22 that allows delivery of fresh air from inlet 24 beneath composting mixture 12, where the air then flows up through composting mixture 12, and finally exhaust air and other gases pass through outlet 26 from above composting mixture 12. Perforated floor 22 or an equivalent means will most desirably equally distribute air throughout sealable container 20, through a large number of relatively small openings. In one conceived alternative embodiment, perforated floor 22 may be divided into four zones. Dampers 44 can then be used to control the pressure in each zone so that an equally distributed flow of air is achieved throughout composting mixture 12. Nevertheless, the use of multiple dampers 44 must be weighed against the cost of these additional components and resulting maintenance. It is preferred that perforated floor 22 be essentially flat and horizontal. Other geometries are believed to result in more tunneling of air flow through mixture 12. Furthermore, a flat, perforated floor 22 is simpler to clean and maintain, and is of lower initial cost. By orienting perforated floor 22 to a horizontal position, air flow may be maintained in an essentially vertical direction, which is most preferred. During dumping, flat perforated floor 22 will also self clean, and no traps or less than ninety degree corners are created that will retain compost. Finally, only a small air space 25 is required, and leachate may be accumulated within air space 25 using flat perforated floor 22.

Air flow inlet 24 to sealable container 20 can be placed at any location near the bottom of container 20, for example at the center of the end of the container or in the longitudinal side offset from the center towards one end. Nevertheless, and while not generally preferred, in some container configurations it may still be most desirable or necessary to place air flow inlet 24 near the top of the container 20. Air flow outlet 26 is most preferably located above the surface of the composting mixture.

Sealable container 20 will also most preferably include a drain 22 and valve 21 for leachate collection. The lines from drain 22 can be heated in cold climates to prevent freezing of leachate. In addition, a small, slightly lower reservoir 27 is provided which acts as a gravity well to collect leachate within container 20, in a region slightly removed from any door gaskets. Leachate reservoir 27 will provide a drainage path which reduces the potential for leakage of leachate through any sidewall door gasket, even when the door gasket fails or is blocked by an errant piece of compost or source material.

Air management apparatus 30 delivers air to composting mixture 12, for aeration and temperature control. A blower 42 moves air through conduits 24 and 32, with the path and rate of air flow controlled by dampers 44, into the bottom of sealable container 20. The air is propelled through perforated floor 22 in sealable container 20 and permeates composting mixture 12. A manifold may be provided on conduit 24 to divide the air into multiple zones, as discussed herein above. Air leaving the top of the composting material can enter conduits 26 and 36, leaving the container and leading to a port 46 from which it may be expelled into the environment. Alternatively, it can be conducted into filtration and/or condensation apparatus 38, which, for example, could be a biofilter such as disclosed in the present inventor's co-pending patent applications, incorporated by reference herein above. A biofilter or condensate collector 38 that absorbs or collects water and other products in the exhaust flow can be useful for regulating the water content of the composting mixture, and for preventing the escape of malodorous or toxic materials in the exhaust flow.

Advantageously, dampers 44 maintain the rate and direction of the flow of air during aeration. Dampers 44 are significantly less expensive than other means for controlling the rate and direction of air flow, such as controlled speed or variable speed or volume fans. The air management apparatus 30 can include manifolds, baffles, electronic controls for the manifolds and baffles, devices that monitor and regulate the direction and rate of the air flow, and other systems to effectively distribute air through the container to control the conditions of composting. These air management components are well known in the art of environmental control and building management. Most preferably, dampers 44 and associated ducts will be designed to reverse air flow through containers 20 on a regular interval, for example at a 25% duty cycle reversed. While for a number of reasons air flow is preferred to occur with convectional assistance, the reversals help to maintain a more consistent temperature throughout the mass.

Sealable container 20 and air management apparatus 30 can be insulated to aid in maintenance of an effective composting temperature. In addition, air management apparatus 30 might include a heated air exhaust system, or other systems required for regulating the temperature of air that is added to or removed from composting mixture 12. As air is moved through air management apparatus 30, biofilter 38, and composting mixture 12, moisture content in the air may increase and condensate can accumulate. Air management apparatus 30 can include a condensate and leachate collection and capture system. This capture system can include leachate drains 23 in biofilter 38, blower 42, and discharge manifold 36. Leachate drain tubes 23 can be heated to prevent freezing. It may be desirable to occasionally stop or decrease air flow through conduits 24 and 32 and other air management equipment, in order to let any trapped moisture condense and drain.

A control unit 50 can include apparatus to monitor, control, record, report or adjust conditions of the composting process and apparatus. The control unit can include sensors for conditions such as temperature, oxygen content, carbon dioxide content, water content, air pressure, baffle position, and other conditions throughout composting apparatus 10. The signals from sensors can be monitored by components within control unit 50 such as a microprocessor or computer, to form a feedback control system for maintaining composting conditions within preselected limits. As a very rudimentary example of a feedback loop, control unit 50 can include a signal to alert the operator that composting conditions need adjustment through re-mixing. In response to the sensors, control unit 50 can also adjust the function of air management apparatus 30. For example, in response to a signal from a thermometer and/or oxygen sensor, a computer in control unit 50 can signal a damper 44 or blower 42 to change the direction or rate of air flow to maintain oxygen level or temperature within containers 20 within preselected limits. Most preferably, dampers 44 are rotary dampers that can be controlled by control unit 50 in response to air pressure (or backpressure) in conduits 32, 36 or container 20.

Figure 4:
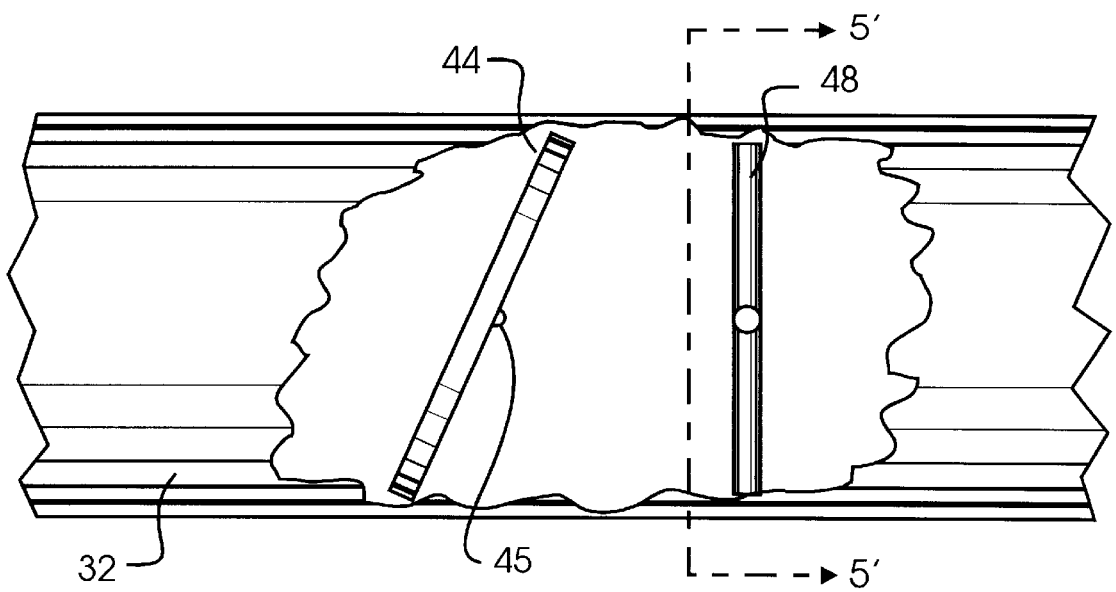
FIG. 4 illustrates an exemplary air conduit by cut-away view illustrating the damper and differential air pressure sensor.
Figure 5:
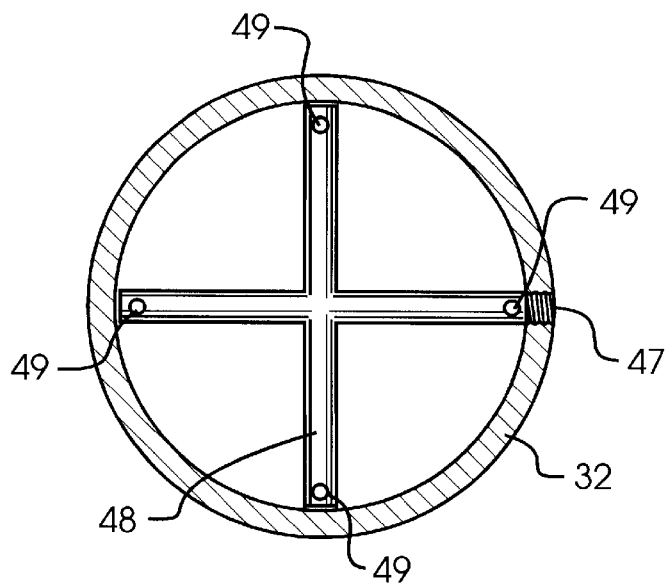
FIG. 5 illustrates the differential air pressure sensor from a sectional view taken along line 5' of FIG. 4.
Figure 6:
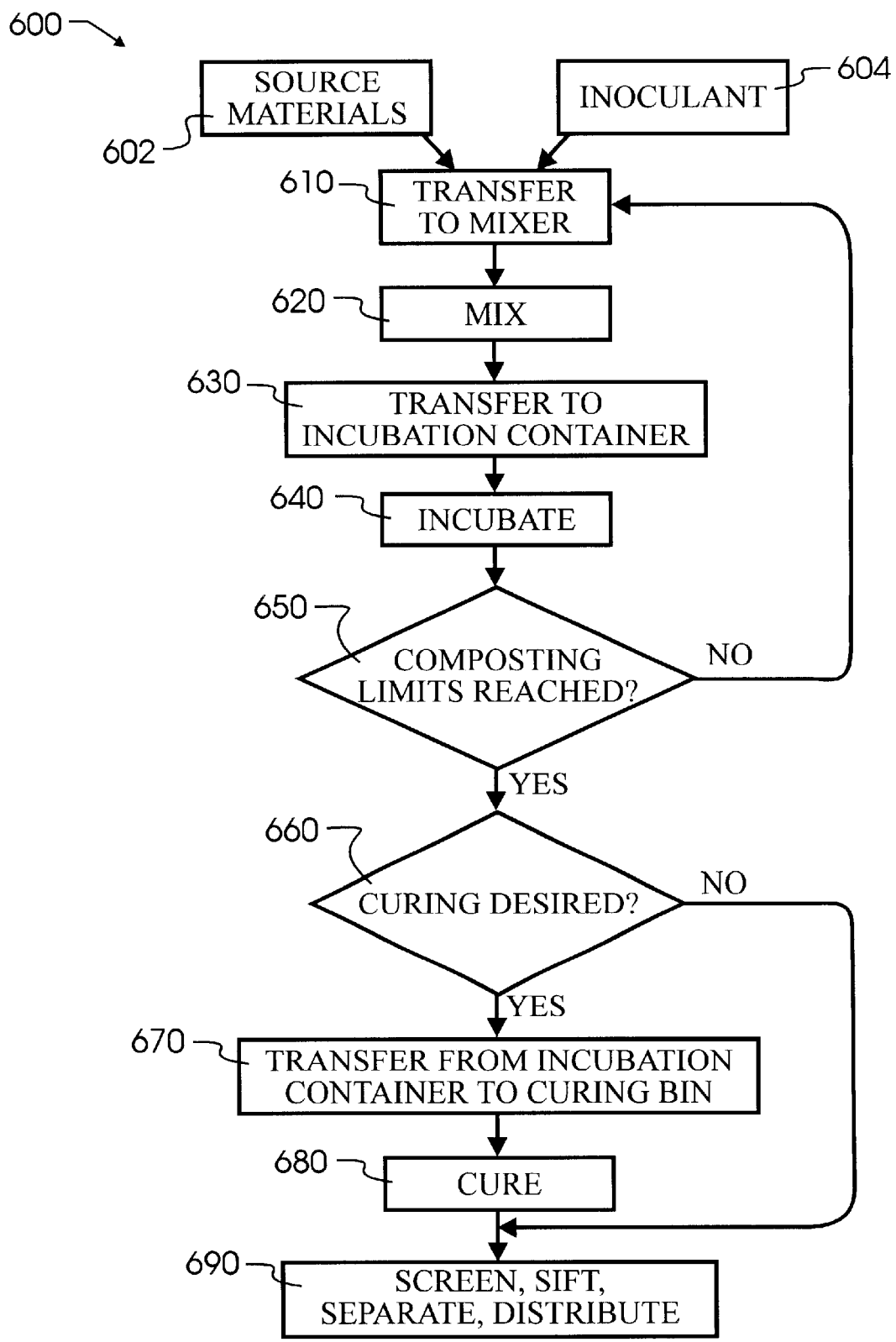
FIG. 6 illustrates the steps of the preferred method of the invention.

FIG. 4 illustrates the most preferred combination of damper 44 with differential air pressure sensor 48. As can be seen therein, within conduit 32 damper 44 is rotationally mounted on shaft 45. Shaft 45 may be, for example, driven by a small motor such as a servomotor. A small differential air sensor 48 includes an inlet with the general configuration of a + sign or x. At the ends of each of the arms are small openings or air inlets 49, through which air passes to a common conduit. The conduit is connected to a pressure sensor such as a diaphragm type differential sensor, which senses the pressure within conduit 32. The use of multiple air inlets 49 spaced throughout the diameter of conduit 32 ensures that turbulence local to a single point within the conduit does not adversely affect sensor 48.

Figure 3:
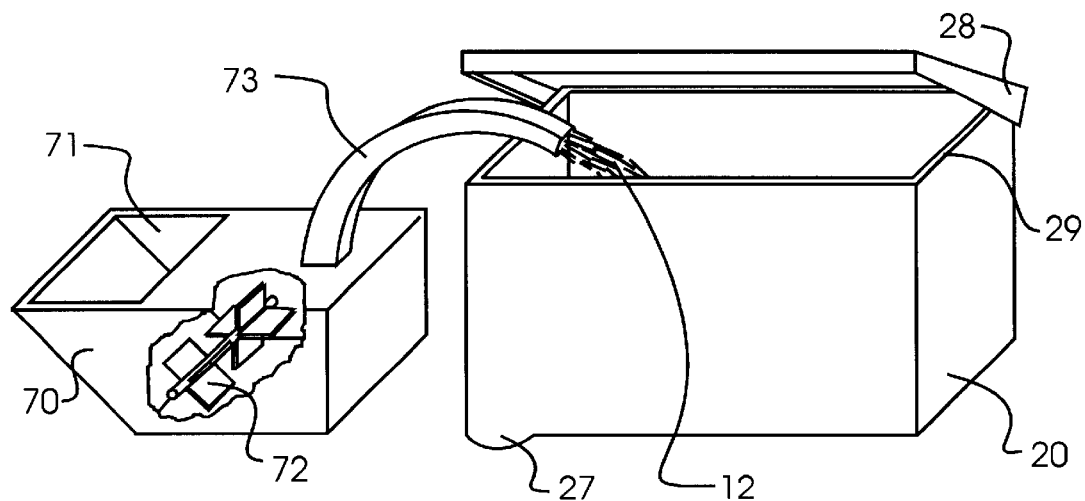
FIG. 3 shows a schematic of a mixer adding material to a sealable container.

As illustrated in FIG. 3, the composting apparatus 10 also includes a mixer 70 including an inlet 71 and paddle wheels 72, or alternatively, an auger or other common apparatus for handling organic or waste materials. Examples of other suitable mixers include silage mixers and the like. Advantageously, mixer 70 is external to the sealable container and can be located at the mixing station.

Use of one or more curing bins 120 frees up space in the typically more expensive sealable containers 20 and decreases overall time for composting. Generally, if the final step of composting will be storing compost in curing bin 120, only one or two re-mixing steps will be preferred prior to storage. Curing bin 120 is similar to sealable container 20 in that it can include air inlet and outlet ports to provide air to a composting mixture, but bin 120 most preferably has no lid. Air is preferably provided to the composting mixture, not to control the temperature of the mixture, but to provide an oxygen source to allow continued decomposition. Process control is less stringent, and sensors are not required. In the embodiment illustrated in FIG. 1, only an air inlet is provided, and the inlet may include a flow restrictor. Most preferably, compost in curing bin 120 will be maintained in the mesophilic temperature range, where it may remain for thirty to ninety days.

Generally, there are the same number of, or less, curing bins 120 than sealable containers 20 in the system. Typically, curing bins 120 are the same size as, or smaller, than sealable containers 20. Curing bin 120 can be any shape and can have a cover or no cover. Preferably, there is no permanent or solid cover or top over curing bin 120, but instead a permeable cloth cover. The cover is selected to allow air and minimal moisture flow therethrough, but to seal in any undesirable odors. Any cloth that provides the desired properties is useable but a preferred cloth material is available from Gore Company under the trade name Gortex™.

In some installations, it may be desired to have condensate gutters 129 located on the upper inside edges of curing bin 120. As the composting material in curing bin 120 further matures and cures, moisture given off condenses on the inside of the cloth cover. Due to the downwardly convex shape of the cover, moisture runs to the edges of bin 120 where it is collected by gutters 129. These narrow gutters can help in keeping condensate from re-moistening curing compost. A drain in gutter 129 is connected via a pipe to the leachate drain 23, which, while not visible in the illustration, will be apparent to those of ordinary skill in the art dependent upon the style of curing bin selected.

The Preferred Embodiment Method

In general, method 600 includes transferring compostable source materials 602 and inoculant 604 to mixer 70, where materials 602 and inoculant 604 are mixed in step 620 to form a compostable mixture 12. Mixture 12 is next transferred to a container 20 in step 630 and allowed to incubate relatively undisturbed at step 640. As aforementioned, air will be passed through compostable mixture 12 without mechanical agitation. Various process limits, discussed in further detail herein below, determine when incubation step 640 is complete. In step 650, the particular process limits that led to the termination of incubation step 640 are considered, to determine whether additional composting is required. In the event composting has not reached completion, container 20 will be emptied back into mixer 70 at step 610, thereby removing mixture 12 from container 20. In this instance, additional source material 602 and inoculant 604 may also be added to mixer 70 in step 610, for mixing in step 620, and mixture 12 will be transferred back in container 12 at step 630. This cycling from step 650 back to step 610 may be repeated as many times as required to reach desired composting limits. Once the desired composting limits are reached, a decision is required at step 660 whether curing is desired. If curing is desired, then composting mixture 12 will be transferred from incubation container 20 to curing bin 120 at step 670. Composting mixture 12 will cure at step 680, and then will be screened, sifted, separated and/or distributed in step 690.

In more detail, source material 602 is sorted, as is generally known in the art, to classify the type of materials and allow any further necessary processing which may be required for the type of material. For example, a source material 602 may be ground, shredded or chipped depending on the desired size or consistency. Depending on moisture content, carbon content, carbon nitrogen ratio, and other known considerations, other source materials 602 including water may be necessary amendments in mixture 12 to provide desired composting behavior. Materials added primarily to assist with or adjust the composting of other source materials 602 will be defined herein to be amendments. Such amendments are desirable, because different source materials 602, in pure or concentrated form, have widely varying rates of composting within composting process 600.

The composition of mixture 12 may also include a bulking agent as an amendment. The bulking agent provides several useful functions in composting process 600 and in composting apparatus 10, including increasing the proportion of solids in the compostable mixture, increasing the amount of air in the compostable mixture, and creating air spaces or voids in the compostable mixture that are maintained or more readily formed later in process 600. These air spaces contain oxygen, an element important for aerobic microbial activity in the composting process; improve handling properties; and also provide a pathway within mixture through which air and other gases move. Depending upon the bulking agent chosen, the bulking agent may also reduce the moisture content of the compostable mixture by providing moisture absorbency or may also provide carbon to the compostable mixture to adjust the carbon content of the compostable mixture.

The amount of bulking agent added can be determined by the amount of free air space that must be added to the organic material to form the compostable mixture. The free air space of each of the ingredients, including the bulking agent, can be determined and these ingredients can then be mixed to achieve the desired level of free air space. The amount of free air space can subsequently be determined by measuring air flow through mixture 12. For example, the number of cubic feet of air per minute that flow through mixture 12 can be determined with a sensor that measures air flow, such as preferred differential air pressure sensor 48 of composting apparatus 10. The flow rate can then be used to estimate free air space in the mixture. The level of free air space can be as low as about 10% or as high as about 65% by volume. The free air space for a particular organic material or for a compostable mixture of a particular composition is selected to be a level that is compatible with effective composting. Preferably, free air space is in the range from about 20% to about 35% by volume in the compostable mixture. The desired or effective amount of free air space can be maintained through composting process 600 by re-mixing to add bulking agent. Establishing and maintaining an effective amount of free air space can maintain effective aeration of the composting mixture. Preferred bulking agents include wood chips, shredded brush, strati, rice hull, peanut shells, pelleted paper, shredded tires, plastic material in various shapes and configurations, and mixtures of these.

The bulking agent can be removed from composting mixture 12 during re-mixing or at the end of composting process 600, either manually or using a machine. One screen suitable for sifting compost is referred to as a tromell screen, which is an inclined rotating drum made of mesh. Fine material falls through the mesh and is collected and fed by conveyor to a holding place.

Although most source material 602 includes or is naturally contaminated with microbes active in composting process 600, it is generally advantageous to add more microbes to source material 602. Adding microbes is called "inoculation" and the microbes added are called the "inoculant". Inoculant 604 is a seed culture that starts microbes growing in the composting mixture to provide greater control of the composting process, to accelerate the process, to provide strains or concentrations of microbes that would not otherwise be present in mixture 12, or for other similar purpose. For example, inoculant 604 can be added to introduce microbes that degrade or consume particular components of mixture 12, such as toxins. Inoculant 604 can be added to mixture 12 not only at the outset of composting, but also may be added under controlled conditions during re-mixing, which provides much greater flexibility in controlling process 600 then was heretofore available. For example, it is possible to add an inoculant 604 during re-mixing that is effective to promote decomposition of already partially composted organic material.

Inoculant 604, which contains active microbes and/or spores, may comprise composted or composting biosolids, bulking agent recovered from composted or composting biosolids, aged and cured compost, compost from recent batches, microbes cultured for inoculating in various stages of decomposition, cultured and isolated microbes, and mixtures of these inoculants. Most preferably, inoculant 604 includes previously composted material made from similar source materials 602.

The amount of inoculant is chosen based, at least in part, on the composition of compostable mixture 12, the relative potency and cost of the chosen inoculant, and the desired composting period. For different compostable mixtures 12 and different source materials 602, the amount of inoculant 604 is adjusted to result in conversion of source materials 602 to composted materials within an acceptable time, typically from about 3 days to 21 days. The amount of inoculant 604 added is seldom less than about 5 percent by weight of the total compostable mixture. When mixture 12 includes substances that are either toxic to microbes, incompatible with composting process 600, or particularly difficult for microbes to break down, the level of inoculant 604 can be increased to as much as 50% of mixture 12. High levels of inoculant 604 allow effective composting in less than optimal conditions. Such high levels of inoculant 604 are typical, and preferred, in composting process 600 when used for remediation. Nevertheless, inoculant 604 will generally either require initial cost, if purified or concentrated, or inoculant 604 will consume valuable space within container 20 that could otherwise be used for source materials 602. Therefore, for more typical source materials 602, inoculant 604 will only make up from about 5 percent by weight to about 20 percent by weight of compostable mixture 12. Preferably, for routine organic material collected by municipalities, inoculant 604 makes up about 10 percent by weight to about 15 percent by weight of compostable mixture 12. More preferably, the amount of inoculant 604 is about 10 percent by weight of compostable mixture 12.

One of the very significant benefits of the present invention is the ability of a relatively inexperienced operator using composting apparatus 10 and the preferred method 600 to successfully and safely compost very diverse source materials 602, even when the full chemical composition of source materials 602 is not known. A source material 602 may be predominantly organic, but could also be composed of inert, inorganic, toxic, or hazardous materials, or other diverse compositions. To successfully compost source materials 602 which were heretofore not suitable for composting, or which required prohibitively expensive systems, the resultant composition of mixture 12 can be adjusted in steps 610–650 of the present method 600 sufficiently to be compatible with microbial degradation. Through the features of the present invention, the adjustment process may occur through several iterations of these steps, if so required. As nature has so elegantly demonstrated on numerous occasions, there are very few materials which are completely resistant to microbial degradation. Nevertheless, less compatible source material 602 can slow or hinder microbial degradation or composting, and so a source material 602 of limited compatibility may be composted, for example, by composting it in a mixture 12 with other, more readily composted source materials 602. Any one source material 602 need only be compatible with composting process 600 to a limited degree, particularly if it is not the only source material used to formulate mixture 12.

Source material 602 may include, but is not limited to, sludge, such as biosolids residuals from municipal wastewater treatment, or industrial waste water treatment residuals. Waste and byproducts from processing crops, foods, and other agricultural products, animal processing waste and byproducts such as entrails or carcasses, manufactured or industrial products including manufactured cellulose products, explosive materials, petroleum products, pahrmaceuticals, industrial and agricultural chemicals, and the like are all examples of diverse source materials suitable for use in composting process 600.

The process of composting toxic or otherwise incompatible organic materials is called "remediation" or "bioremediation". Toxic or incompatible source materials that can be remediated using the preferred method 600 include, but are not limited to, hydrocarbons and synthetic organic compounds such as herbicides, pesticides, oil, solvents, petroleum products, diesel fuel, gasoline, hydraulic fluid, obsolete ordinance, TNT, pharmaceuticals, and alcohols such as ethanol and methanol. Soil including about 2% oil, other petroleum distillates or synthetic organic chemicals can be readily composted by mixing with other organic material. High nitrogen biosolids are a preferred source material 602 for adjusting the content of mixture 12 which contains other toxic or incompatible source materials 602, since biosolids tend to maintain greater microbial activity. For example, once the presence of such incompatible materials is known or suspected, their amount can be kept to compatible low levels or they can be mixed with a compatible material. Most preferably, in bioremediation, the soil or other contaminated matrix is mixed with an organic source material that is already at least partly composted. The organic source material 602 can come in many forms that have various degrees of compatibility with composting. Many of the characteristics of these materials can impact the composting process and can be adjusted by subsequent steps, including the re-mixing and incubating of steps 610–650.

Once all of the source materials 602 have been selected for inclusion in mixture 12, source materials 602 are loaded into mixer 70 for mixing in step 620. Mixing or re-mixing mixture 12 with bulking agent and inoculant can have several beneficial effects. Mixing helps to distribute the inoculant and bulking agent evenly through mixture 12. This results in more even and efficient composting of the composting material.

Next, mixture 12 is loaded in step 630 into an incubation container such as sealable container 20, sealed, and moved to a site for incubation. Once in place, air and condensate lines and any sensors are connected to the container and the mixture is allowed to incubate undisturbed in step 640. During this period, microbes grow, reproduce, feed upon and digest mixture 12 to produce composted organic material. Of course, the microbes can also digest amendment, bulking agent, other microbes and anything else that may be in mixture 12 during composting process 600. By leaving mixture 12 mechanically undisturbed, while simultaneously providing oxygen and removing heat, fungi such as Actinomycetes are able to grow and develop fibril networks. These fungi are beneficial to process 600, since they assist with the decomposition of fatty acids and carbohydrates that can otherwise later putrefy.

A first time composting mixture 12 and re-mixed composting mixture 12 each involve similar considerations for maintaining conditions, timing, and the like. Incubation is carried out for sufficient time to result in effective composting of the organic material, although other durations can also be used that may more thoroughly or only partially compost mixture 12. In some applications, incubation for composting can be supplemented by retention in sealable container 20 for pathogen destruction. Pathogen destruction can be accomplished by 72 continuous hours of incubation at more than 55° C. under conditions described as "in-vessel composting" under the Rules for Biosolids Management of the United States Environmental Protection Agency, 15 Part 503. As aforementioned, safety of the finished compost is enhanced by preferred insulated container 20, which maintains a very even temperature throughout all of mixture 12, thereby helping to ensure that the entire mass is exposed to sufficient temperature.

A 40% decrease in volume is often seen during a 7–21 day incubation. The decrease in volume is caused by various factors, including compaction. A large amount of water, moisture and gases are also generated and released during the incubation process, which causes additional volume decrease. Liquids drain through mixture 12, through perforated floor 22 of sealable container 20, and may be collected by a leachate system outside of container 20. Although the compostable mixture 12 itself can decrease to a size where it would be able to pass through the perforations in floor 22, the mixture as a whole is generally non-flowable, and loss of material through floor 22 is minimal.

During incubation at step 640, which frequently comprises a significant time portion of composting process 600, various conditions in container 20 may be monitored, either continuously or intermittently and either by automated equipment or by manual techniques. Controls which can also be designed to store and process information, using microprocessors and the like, are preferred. Composting conditions can be monitored by sampling the composting mixture 12, for example by opening sealable container 20, either via top lid 28 or a sampling chamber or orifice, or by sensors or detectors that are inserted into the container, the air handling apparatus or the composting mixture. Monitoring can even be achieved by a worker skilled in the art who is able to sense the condition of the composting mixture by, for example, smell, sight, or touch.

Conditions of composting mixture 12 that can be monitored include, preferably, temperature, oxygen content, water content, carbon content, microbial activity, and combinations of these conditions. Ambient temperature can be monitored as well. For example, controlling temperature within mixture 12 can maintain efficiency of the composting process and decrease odor production. Furthermore, a controlled and uniform temperature provides for more reproducible production of composted material. For most source materials 602, an incubation temperature between about 40° and 60° C. is most preferred. If a temperature greater than 60° C. is reached, thermophiles that cause decomposition become stressed, and the composting process does not produce the same quality compost. At temperatures below about 40° C., except during the very initial phases of self heating, biological decomposition of many source materials 602 occur too slowly and inefficiently to effectively utilize composting apparatus 10.

In sealable container 20, air flow through container 20 is most preferably used to control the temperature of mixture 12. A thermometer can signal air management apparatus 30 to slow the flow of air when the temperature of composting mixture 12 is too low, and to increase the flow of air when the temperature is too high. Aeration can be used not only to control temperature but also to adjust or control the environment in other ways, including, for example, the oxygen and water content, and can be accomplished by applying either positive or negative air pressure on the sealable container, intermittently or continuously.

Aeration without first humidifying the source air removes water from mixture 12 and also consumes energy, so effective monitoring of incubating conditions can minimize the expense and adverse effects of aerating. Preferably, for most typical source materials 602, aeration is effective to maintain the temperature of composting mixture 12 within desired limits while minimizing, to the extent possible, drying of the composting mixture. Water content in composting mixture 12 typically needs to remain between about 40 percent and 65 percent by weight. Hence, it is advantageous to regulate air flow and monitor water content in mixture 12, to maintain an effective concentration of water and thereby maintain desired microbial activity.

An electronic oxygen sensor as a component of air management apparatus 30 could similarly regulate and maintain the oxygen level in composting mixture 12. When the oxygen level is too low for microbial activity, air flow would be increased. However, the rate of aeration required to maintain composting temperatures in container 20 is typically much greater than required to provide oxygen for the microbes.

Water content and the carbon:nitrogen ratio can also change through composting process 600 and can be monitored in composting mixture 12. Should the content of carbon or water be outside a desired range, the content can be adjusted by re-mixing. Water content can also be maintained or increased by adding water to container 20, and to some extent, by addition of humidified air to container 20. Water content may be decreased by intentionally aerating mixture 12 beyond the levels required for temperature control or oxygenation.

Additional control over the incubation environment is available using aeration in combination with other gases besides air, or with materials that may be introduced into mixture 12 through the aeration system or removed from mixture 12 during aeration. This flexibility allows process 600 the ability to compost quite unusual source material 602 that could not otherwise be composted in a prior-art system. For example, alcohol-laden source materials, which tend to "sanitize" a microbial environment and therefore resist composting, may be composted by first evaporating or microbiologically destroying the alcohol through aeration. While other in-vessel reactors would undesirably emit the volatile material, the preferred biofilter incorporated by reference hereinabove can be used to further decompose the alcohol, and yield a purified air stream without hazardous emissions. In other instances, it may be desirable to introduce a particular gas or emission directly into air management apparatus 30, in which case the gas may be considered to be a source material 602 or an amendment.

Monitoring incubation conditions is one of the advantageous aspects of method 600. Proper choice of incubation conditions and monitoring to maintain these conditions facilitates rapid composting. Furthermore, the finished product of the composting process will be consistent, due to the uniformly controlled conditions. In other words, with the same source material 602 and inoculant 604, and a consistent process, finished compost will have very consistent and predictable properties. Furthermore, when source materials 602 vary, process 600 will quickly correct for the variance, by triggering re-mixing followed by incubation, until the desired product is generated.

Mixture 12 incubates undisturbed until amendment is needed, which will be understood herein as the need for altering the contents or composition of mixture 12. This determination may be made from a variety of different observations or sensed conditions. For example, a mixture 12 that is not undergoing adequate microbial degradation will also not provide sufficient exothermic energy to self heat the contents of container 20. In such a case, temperature probes placed within container 20 will detect a temperature or temperature profile which is inadequate to fully compost mixture 12. The lack of sufficient exothermic energy is one indicator that may represent a need to return from step 650 to step 610. Other indicators include, but are not limited to, inadequate air flow through mixture 12 or excessive back-pressure, each which may signal excessive compacting, production of unusual or undesirable gases, incorrect moisture content, or uneven temperatures or temperature profiles within the mass of mixture 12.

Once the need for amendment has been established, air, condensate and sensor lines are unhooked from container 20 and container 20 is most preferably transported to mixer 70. Mixture 12 is then transferred from container 20 into mixer 70, typically by tipping container 20 to dump all contents into mixer 70. One of the advantages of the preferred apparatus of the present invention, which was referenced herein above, is the self-cleaning nature of container 20. Flat perforated floor 22 will naturally be cleared of any blockage during the dumping of container 20. Any finer material which has passed through floor 22 during incubation will also be released, passing back through floor 22 during dumping, thereby preventing any accumulations from blocking air flow underneath floor 22. The simple geometry of most preferred container 20 further assists in the release of mixture 12 from container 20.

The mixing station, which is where mixer 70 is located, can be immediately adjacent the incubation location, or can be remote therefrom. Once mixture 12 has been removed from sealable container 20 and deposited in mixer 70, water, wood chips, bulking agents, additional compostable material, additional inoculants, or any other source materials 602, which will be referred to herein as amendments in this re-mixing step, can be mixed with mixture 12. The amount of amendment to be added can be readily calculated using techniques known in the art and documented more thoroughly elsewhere. For example, routine analysis of mixture 12 and amendment can determine pertinent characteristics of each material, such as water content, carbon content, nitrogen content or carbon:nitrogen ratio. Then, knowing the weight percent of water for both mixture 12 and the amendment and the weight of mixture 12 allows calculation of the amount of amendment to be added to mixture 12 to yield the desired weight percent of water in the amended mixture 12. Similar calculations can be performed to amend other characteristics of mixture 12, as is known. It is advantageous to evenly mix the amendment into mixture 12. Mixing causes the amendment to be uniformly distributed through mixture 12 resulting in a more uniform composition. The newly amended mixture 12 is returned to a sealable container, moved to the incubation site, and the composting process continues.

One advantage of the preferred method 600 is that it allows composting at relatively wide ranges of water content, and wide carbon:nitrogen ratios typically maintained within a ratio of from about 25:1 to about 35:1. As a result, method 600 allows the use of smaller quantities of amendment. Less material needs to be added to adjust the water content or the carbon and nitrogen content of the compostable mixture, which can save the time and money expended in the purchase of amendments and the space to store them. In addition, this provides for composting more source material 602 in each volume of container space.

Re-mixing is also useful to maintain the volume of the composting mixture in sealable container 20. New source material 602 can be added to replace volume lost during decomposition. As discussed herein above, a reduction in the volume of a composting mixture is typical. Although volume reduction provides a smaller volume of composted organic material to handle after the composting process, volume reduction presents several disadvantages during composting. For example, filling air spaces and voids in the composting mixture can hinder the flow of air through the composting mixture and reduce the benefits of aeration. This can lead to insufficient control of the temperature such that parts of the composting mixture become too hot. In addition, uneven aeration can result in insufficient oxygen supply for microbial activity in some parts of the composting mixture. Either situation results in parts of the composting mixture not composting properly.

Volume reduction has another undesirable effect as well. Container 20 and other apparatus used for composting are a valuable capital asset. As the volume of composting mixture 12 in container 20 decreases, there is a large amount of valuable equipment capacity that is not being used. Re-mixing mixture 12 and completely re-filling container 20 provides more efficient use of capacity within composting apparatus 10.

Re-mixing can have another more subtle effect on composting mixture 12 as well. Re-mixing can regulate the variety of microbes found in the composting mixture. It has been established that the types of microbes present in a composting mixture change throughout the composting process. Different microbes have optimal activity under different conditions and at different stages of degradation of the organic material. For example, the chemical composition of mixture 12 will change throughout the composting process, which can provide different levels of compounds that are nutrients, regulators, or toxins for different microbes. In addition, different microbes can have different activities under different levels of compaction of the composting mixture, at different temperatures, or with variation of other conditions in the mixture. Furthermore, the presence of certain microbes can suppress or increase the growth of other microbes.

Re-mixing can be effective to control the mixture of microbes, by adding materials to change the composition of the composting mixture, or adding materials to change the bulk properties of the composting mixture. This changes the environment, which in turn changes the microbial mix. Hence, monitoring conditions within composting mixture 12 and re-mixing at optimal times, allows optimization of the mix of microbes to more effectively control the composting process.

Re-mixing in a controlled setting such as in a mixer external to sealable container 20 further allows control of decomposition through introduction of different inoculants 604 containing colonies or cultures of species of microbes best suited to a particular function. For example, this can be accomplished by blending an effective amount of composted material, from a previous batch extracted at a particular time or temperature, into a subsequent batch of composting mixture 12. Such re-mixing results in the addition of a composting mixture that has been incubated for a different amount of time and which may, therefore, have a different microbial mix. This type of re-mixing, which is possible in a batch composting process with controlled mixing, can yield engineered microbial activity specific to a particular source material 602, and will also help to ensure an even distribution of microbial activity throughout mixture 12. The significance of engineered microbial activity to some of the more difficult or hazardous source materials 602 cannot be overemphasized.

These steps of amending, re-mixing, and incubating can be repeated until a satisfactory final product is obtained. Alternatively, it may be desirable at some point in the process to transfer mixture 12 to curing bin 120 rather than sealable container 20. This decision will be made in step 660. Once composting mixture 12 has cooled down and produces temperatures safely less than 60° C., it may be transferred to curing bins 120, typically covered with a porous flexible cover, and allowed to sit and cure. Curing bin 120 can be located at the same location as incubating container 20. Most preferably, a safe and stable temperature is maintained within bin 120, without the need for thermostatically controlled cooling.

During process 600, sealable containers 20 with composting mixture 12 inside can be located at a site remote from the mixing station where the containers were filled. This site where containers 20 are located is called "site remote", which designates that the container must be transported to mixer 70. After sufficient incubation of compostable mixture 12 in step 640, sealable container 20 is moved from site remote back to the mixing station where mixture 12 is dumped and re-mixed, in steps 610 and 620. In some circumstances, the mixing station can be adjacent to the composting site or location, so that transport of container 20 is quite limited. It is preferred that sealable container 20 is sized to fit on a flat bed truck, roll-off truck, trailer chassis, or a similar vehicle, and that container 20 have the necessary features to operate synergistically with the transporting vehicle. For example, a container designed to be handled by a fork truck or pallet jack will most preferably have a feature, usually at the base but not necessarily, designed to receive the fork. This is typically a pair of openings that extend in the direction the forks will pass, but which are otherwise blocked, so that container 20 will be limited on an axis perpendicular to the forks and not be able to slide off of the forks, except on axis.

Depending on the size of container 20 and the size of the truck, it may be possible to is transport two or three sealable containers simultaneously. A fork truck can be used to transport smaller containers 20 from the composting site to the mixing station. Sealable container 20 can be dumped, i.e., emptied, by the same transport vehicle. For example, the fork truck used to transport a 1 cubic yard container can also tip the container and dump the contents. Alternately, the container can be dumped by a separate piece of machinery, for example, a crane or stationary tipping platform. Since re-mixing requires labor and equipment, re-mixing only when necessary can result in significant economies. With effective monitoring of the incubation conditions in accord with the preferred method 600, re-mixing can be done only when necessary.

Composting according to the preferred method of the present invention is faster compared to uncontrolled composting and more complete when run under conditions that are maintained to facilitate composting. For example, about 40,000 pounds of biosolids can typically be composted in a 40 cubic yard container in less than about 3 weeks. Furthermore, the resulting composted material produced from preferred process 600 may be significantly safer than compost produced through other prior art methods due to the ability to meet the EPA requirements mentioned herein above, throughout the entire mass of mixture 12. Remediation of about 30,000 pounds of soil contaminated with petroleum products or agricultural chemicals can be complete in a 40 cubic yard container in less than about 3 weeks.

After the organic material is composted, it can be screened to separate composted organic material from larger, less degraded material. The composted material can be removed from the process and packaged or distributed for other uses or disposal.

Preferred Systems of the Present Invention

The apparatus 10 and method 600 of the invention are scalable to include various systems designed for particular composting needs. A first embodiment of a system according to the invention can be used in highly populated or urban areas, or other areas where space is limited. This system can be placed in small areas, for example at community nature centers or recycling stations. The area needed is generally about 3000 square feet per ton per day of processing capacity. This system generally includes at least one sealable container 20 having a volume of approximately one cubic yard, an air management system 30 to move air through container 20, and a dumping system which may be, for example, a stationary or mobile tipper. Any biofilter 38 or curing bin 120 should be approximately the same size as container 20. Construction equipment including hydraulics and loaders, such as are sold under the trademarks Bobcat and Skid-Steer, are ideal for such transporting container 20 or biofilter 38 in such a system. Forklift trucks and pallet jacks may also find much utility in this system. Most preferably, and as aforementioned, container 20 in this system will have features, such as a pallet-type base, that enable the transport machine to easily engage with container 20.

A second embodiment is for larger areas, for example, municipal composting and recycling stations, waste handling stations, abandoned railroad yards, desert flats, and other such areas. The area generally needed is about 1 to about 20 acres. This system generally includes a plurality of sealable containers, typically about 4 to about 200 containers, with each container preferably having a volume from 20 to 120 cubic yards, most preferably between about 40 and 50 cubic yards. The system can further include a biofilter 38 and, optionally, at least one curing bin 120, with each biofilter 38 or curing bin 120 most preferably having a 20 to 30 cubic yard volume. Containers particularly suited for this embodiment include roll-off garbage, rubbish or construction containers, that have been only slightly modified to seal and accept conduit connections, leachate drains, and temperature or other sensors. Typically, one end of a roll-off container has wheels thereon, thereby allowing the container to be easily moved if the opposite end is picked up. A transport system for this system can include equipment such as a roll-off truck with a winch, a larger fork truck or front-end loader, or other vehicles capable of lifting and dumping the sealable containers. A dumping system for this system can include a mobile or stationary tipper.

A third embodiment is designed for extensive areas, typically from about 10 to about 1000 acres. Such areas include abandoned railroad yards and ports. This system generally includes from about 40 to about 2000 sealable containers, at least one biofilter 38 and, optionally, a plurality of curing bins 120. The sealable containers, biofilter, and curing bins are preferably manufactured in accord with, and function similarly to existing intermodal containers. Intermodal containers are stackable and are designed to be transported by truck, railroad, or on large ocean going vessels and typically have a volume from about 40 to 120 cubic yards, preferably 80 cubic yards. These intermodal containers are generally moved by a large overhead crane or oversize wheel loader and can be dumped by a stationary or mobile tipper.

Although three specific embodiments of systems have been provided, other sized containers, transport vehicles and dumping systems can be designed to provide a system suited for a particular location and composting need.

Optimal locations for the composting system of the invention include inactive or underutilized sidings, railroad yards and shipping ports, and other under-utilized areas that are easily accessible, including, for example, salt flats, desert areas, and old warehouse areas. Small systems can be located in highly populated urban areas, for example at nature centers, recycling stations, prisons, universities, resorts, or on-board ocean going vessels. One of the capabilities of the present invention using the teachings herein is the conversion of source materials 602 within a container 20 such as an intermodal container during transport. A fixed location is not a requisite of the present invention, and the entire composting apparatus 10 may be mobile. Rather than shipping garbage, waste, or even hazardous waste, the preferred apparatus, method and systems enable the garbage or waste to be a source material, and, during transit, the garbage or waste to be converted into valuable compost for use at the destination. While intermodal containers may be preferred for these mobile applications, any of the other containers may also be suitable or preferable for a particular application.

While the foregoing details what is felt to be the preferred embodiment of the invention, no material limitations to the scope of the claimed invention are intended. Further, features and design alternatives that would be obvious to one of ordinary skill in the art in light of the present disclosure are considered to be incorporated herein. The number of possible variants is simply too great to attempt to iterate each herein. The scope of the invention is set forth and particularly described in the claims herein below.

I claim:

1. An apparatus for composting source material comprising:
   (a) a moveable, sealable container having a base and sidewalls defining a central cavity, a perforated floor within said first cavity, and first and second gas-permeable ports;

(b) an aerating means for actively transporting a gaseous material through said first and second gas-permeable ports;

(c) insulation encompassing said first cavity, whereby a temperature within said first cavity is consistent throughout all points within said cavity, whereby a pathogenic destruction may be reliably performed throughout said first cavity without regard to specific location therein;

(d) conduits to conduct said gaseous material to said sealable container and out of said sealable container;

(e) at least one damper within said conduits for allowing or restricting said gaseous material transport;

(f) an air pressure sensor for sensing a condition within said composting apparatus having multiple inputs distributed at sufficiently spaced points within said conduits to be unaffected by common turbulence; and (g) a control means for controlling said at least one damper responsive to said sensed condition whereby said allowing or restricting of said gaseous transport may be controlled by said control means;

whereby, when said apparatus for composting contains source material, said gaseous material is actively transported from one of said first and second gas-permeable ports, through said perforated floor evenly through said source material, and subsequently through the other of said first and second gas-permeable ports.

2. The apparatus for composting source material of claim 1, wherein, in a first configuration of said at least one damper, said gaseous material is transported into said first gas-permeable port and out of said second gas-permeable port, and in a second configuration, said gaseous material is transported into said second gas-permeable port and out of said first gaspermeable port, whereby said gaseous material is transported in opposite directions dependent upon a first or second configuration of said at least one damper.

3. The apparatus for composting source material of claim 1, wherein said base further comprises a substantial planar region which is relatively planar and a gravity well for collecting leachate at a lower level than said substantially planar region.

4. The apparatus for composting source material of claim 1, further comprising a lid opposite said base which may be opened, whereby when said lid is on top of said apparatus, said source material may be loaded from above said apparatus after opening said lid and maybe unloaded through said lid by inverting said apparatus, said perforated floor self-cleaned responsive to said inversion.

5. The apparatus for composting source material of claim 1, further comprising a means to engage a fork-truck fork from a first axis and limit relative motion between said fork and said apparatus perpendicular to said first axis.

6. The apparatus for composting source material of claim 1, further comprising a means to engage a roll-off truck, whereby said apparatus may be loaded, transported and dumped from said roll-off truck.

7. The apparatus for composting source material of claim 1, wherein said apparatus is configured as an intermodal container, whereby said apparatus may be handled and transported using handling and tipping equipment commercially available for intermnodal containers.

8. An apparatus for composting source material comprising:

(a) a moveable, sealable container having a base and sidewalls defining a central cavity, a perforated floor within said first cavity, and first and second gas-permeable ports;

(b) an-aerating means for actively transporting a gaseous material through said first and second gas-permeable ports;

(c) conduits to conduct said gaseous material to said sealable container and out of said sealable container;

(d) at least one damper within said conduits for allowing or restricting said gaseous material transport;

(e) an air sensor for sensing a condition within said composting apparatus having multiple inputs distributed at sufficiently spaced points within said conduits to be unaffected by common turbulence; and (f) a control means for controlling said at least one damper responsive to said sensed condition whereby said allowing or restricting of said gaseous transport may be controlled by said control means;

whereby, when said apparatus for composting contains source material, said gaseous material is actively transported from one of said first and second gas-permeable ports, through said perforated floor evenly through-said source material, and subsequently through the other of said first and second gas-permeable ports.

9. The apparatus for composting source material of claim 1, wherein said air sensor having multiple distributed inputs further comprises a differential air pressure sensor.

10. A compost apparatus which reliably detects inadequate air flow through a composting material, comprising:

(a) a sealable container having a central cavity, and at least one gas-permeable port permitting an exchange of a gaseous material with gas within said central cavity;

(b) an aerating means for actively transporting said gaseous material through said at least one gas-permeable port;

(c) at least one means for controlling said gaseous material transport;

(d) a differential air pressure sensor for sensing a level of said gaseous material transport within said compost apparatus having multiple inputs distributed at sufficiently spaced points within said compost apparatus to be unaffected by common turbulence and to therefore accurately sense the level of said gaseous material transport; and (e) a control means for controlling said at least one gaseous material transport controlling means responsive to said sensed condition;

whereby, when said compost apparatus contains a composting material, said gaseous material is actively transported through said at least one gas-permeable port and accurately monitored.

\* \* \* \* \*